Jan. 4, 1944. W. G. FRIAR 2,338,325
SEXTANT
Filed Feb. 4, 1942
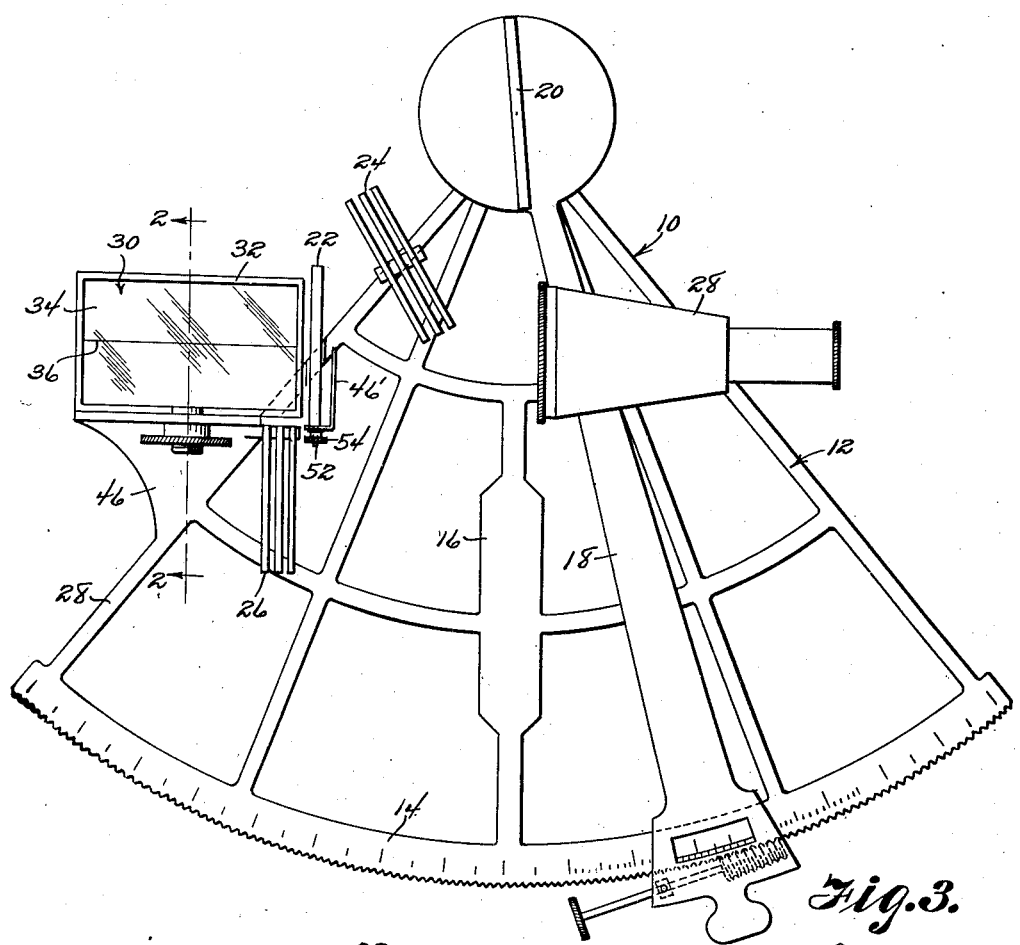
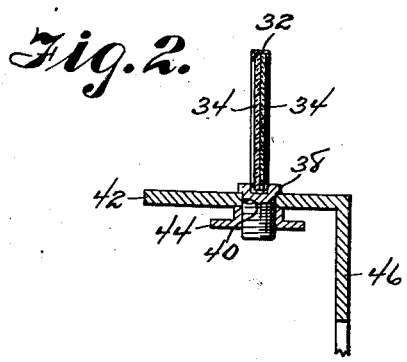
Walter G. Friar
INVENTOR.
BY
Victor J. Evans & Co.
ATTORNEYS Patented Jan. 4, 1944

2,338,325

UNITED STATES PATENT OFFICE 2,338,325

SEXTANT

Walter G. Friar, Los Angeles, Calif.

Application February 4, 1942, Serial No. 429,553

1 Claim. (Cl. 88—2.2)

My invention relates to sextants, and has among its objects and advantages the provision of an improved auxiliary horizon mirror means designed to reflect a part of the horizon that is clear to take the place of the regular horizon when the latter is obscure, as when distorted by refraction, obscured by fog banks, rain squalls, or any land interference with observations at sea.

In the accompanying drawing:

Figure 1 is an elevational view of a conventional sextant illustrating my invention incorporated therein;

Figure 2 is a sectional view along the line 2—2 of Figure 1; and

Figure 3 is a perspective view of a blank operating in conjunction with the usual horizon mirror.

In the embodiment selected for illustration, the sextant 10 comprises the usual frame 12 provided with a sextant arc 14. A handle 16 is attached to the frame 12, and the index arm 18 is provided with the usual index mirror 20. The frame also includes the usual horizon mirror 22, index mirror shades 24 and horizon shades 26. The telescope is indicated at 28. The structure so far described is old.

Upon the forward frame member 28 of the sextant frame 12 is mounted an auxiliary horizon mirror 30, which mirror comprises a rectangular frame 32 within which are mounted two mirror elements 34 arranged back to back and each provided with a horizontal hair line 36 in the line of sight of the telescope 28. To the frame 32 is secured a pivot or pin 38 fitting snugly yet rotatably in a bore 40 in a supporting plate 42 on which the lower run of the frame 32 rests.

The auxiliary mirror 32 may be rotated about the axis of the pivot 38 and made secure to the plate 42 by tightening a nut 44 having threaded connection with the pivot 38 and engaging the bottom face of the plate 42. To the plate 42 is secured a flange 46 welded or otherwise secured to the forward member 28 of the sextant frame.

In operation, when the regular horizon is unsatisfactory, the auxiliary horizon mirror 30 is placed in position on the sextant. The auxiliary horizon mirror is adjusted to reflect a good horizon across the clear part of the horizon mirror 22. The sextant is held to retain the reflected horizon in the center of the horizon mirror 22, and the sun is brought to meet the reflected horizon, after which observation is taken as under ordinary conditions. The auxiliary horizon mirror 32 may be detached from the sextant and need not be used when taking an observation when the regular horizon is satisfactory.

The auxiliary mirror 30 pivots easily when the nut 44 is unloosened, and the mirror is firmly secured through tightening of the nut when it is adjusted to the desired position. The pivot 38 fits snugly in the bore 40 to eliminate lost motion when the auxiliary mirror is under adjustment in selecting a horizon. The axis of the pivot 38 is centered in the center line of sight through the clear portion of the horizon mirror 22.

The hair line 36 on the auxiliary horizon mirror provides an indicator which determines the vertical position of the sextant when the hair line and the horizon are in coincidence, which is required when taking an observation to eliminate error. This hair line is not clearly visible through the magnifying telescope, so that it is advisable to employ the open tube sight when setting the auxiliary horizon mirror 30.

In Figure 3, I illustrate a blank 46' having a right angular flange 48 provided with a slot 50. The frame of the horizon mirror 22 is provided with a screw 52 provided with a nut 54. The flange 48 may be clamped to the horizon mirror 22 through tightening of the nut 54, as illustrated in Figure 1. When so positioned, the blank 46' blanks off the lower margin of the clear portion of the horizon mirror 22, so that the upper edge of the blank functions as a hair line and can be distinguished through the magnifying telescope. This edge must be parallel with the horizon before the observation is taken.

Without further elaboration, the foregoing will so fully illustrate my invention, that others may, by applying current knowledge, readily adapt the same for use under various conditions of service.

I claim:

In a sextant, the combination of a horizon mirror, an auxiliary horizon mirror for reflecting an auxiliary horizon across said first-mentioned horizon mirror, means pivotally mounting the auxiliary horizon mirror on the sextant for rotation about an axis paralleling the plane of the sextant, said auxiliary horizon mirror being provided with opposed reflecting surfaces, each having a hair line, and a blank member attachable to the first-mentioned horizon mirror having an edge extending across the clear portion of the first-mentioned horizon mirror to constitute a hair line.

WALTER G. FRIAR.